(12) United States Patent
Hall et al.

(10) Patent No.: US 10,003,871 B1
(45) Date of Patent: Jun. 19, 2018

(54) AUDIO TRANSMITTING TABLE

(71) Applicants: David R. Hall, Provo, UT (US); Daniel Garvin, Provo, UT (US); Joe Fox, Spanish Fork, UT (US); Hyrum Malone, Provo, UT (US); Justin Robinson, Provo, UT (US)

(72) Inventors: David R. Hall, Provo, UT (US); Daniel Garvin, Provo, UT (US); Joe Fox, Spanish Fork, UT (US); Hyrum Malone, Provo, UT (US); Justin Robinson, Provo, UT (US)

( * ) Notice: Subject to any disclaimer, the term of this patent is extended or adjusted under 35 U.S.C. 154(b) by 0 days. days.

(21) Appl. No.: 15/615,435

(22) Filed: Jun. 6, 2017

(51) Int. Cl.
*H04R 5/02* (2006.01)
*H04R 1/02* (2006.01)
*H04B 1/20* (2006.01)
*H04R 1/08* (2006.01)
*H04R 1/04* (2006.01)
*H04R 3/00* (2006.01)

(52) U.S. Cl.
CPC ............ *H04R 1/025* (2013.01); *H04B 1/205* (2013.01); *H04R 1/04* (2013.01); *H04R 1/08* (2013.01); *H04R 5/02* (2013.01)

(58) Field of Classification Search
CPC ......... H04R 1/025; H04R 3/005; H04B 1/205

USPC ......................................................... 381/301
See application file for complete search history.

(56) References Cited

U.S. PATENT DOCUMENTS

| | | | |
|---|---|---|---|
| 5,365,862 A * | 11/1994 | Peterson | A47B 9/00 108/147 |
| 6,201,876 B1 * | 3/2001 | Niemi | H04M 1/03 381/355 |
| 2008/0067749 A1 * | 3/2008 | Slappay | A63F 1/06 273/309 |
| 2008/0118053 A1 * | 5/2008 | Beam | H04R 1/025 379/388.01 |
| 2010/0177178 A1 * | 7/2010 | Burns | G06K 9/00221 348/61 |
| 2016/0036987 A1 * | 2/2016 | Cartwright | H04M 3/568 381/17 |
| 2016/0077615 A1 * | 3/2016 | Schwarz | G06F 3/041 345/173 |
| 2016/0260019 A1 * | 9/2016 | Riquelme Ruiz | A47B 21/007 |

* cited by examiner

*Primary Examiner* — Vivian Chin
*Assistant Examiner* — Ammar Hamid

(57) ABSTRACT

An audio transmitting table is disclosed which, in general, includes a table top, frame, a controller, and multiple microphones. The table top has one or more non-perpendicular contour edges. The frame is attached to the table top. The controller is attached to the audio transmitting table. The multiple microphones are embedded in the non-perpendicular contour edges. Each microphone transmits audio data to the controller.

20 Claims, 10 Drawing Sheets

AUDIO TRANSMITTING TABLE

BACKGROUND

Field of the Invention

This invention relates generally to the field of table technology, and more specifically to audio transmitting tables.

SUMMARY OF THE INVENTION

An invention has been developed in response to present state of the art and, in particular, in response to problems and needs in the art that have not yet been fully solved by currently available systems and methods. Accordingly, an audio transmitting table has been developed. Features and advantages of different embodiments of the invention will become more fully apparent from the following description and appended claims, or may be learned by practice of the invention as set forth hereinafter.

An audio transmitting table is disclosed which, in general, includes a table top, frame, a controller, and multiple microphones. The table top has one or more non-perpendicular contour edges. The frame is attached to the table top. The controller is attached to the audio transmitting table. The multiple microphones are embedded in the non-perpendicular contour edges. Each microphone transmits audio data to the controller. The microphones may comprises a microphone speaker combination.

The contour edges may include apertures which house the microphones. The apertures may include acoustic insulation. The acoustic insulation may be positioned between each aperture and corresponding microphone.

The contour edges may include a chamfer. The contour edges may include a fillet. The contour edges may include an ogee surface. The contour edges may include a concave surface.

The frame may include multiple legs. The frame may include a column.

The audio transmitting table may include a temperature sensor electrically connected to the controller. The audio transmitting table may include a light sensor electrically connected to the controller. The audio transmitting table may include a temperature sensor electrically connected to the controller.

The microphones may include a capacitor microphone. The microphones may include a dynamic microphone. The microphones may include a piezoelectric microphone. The microphones may include a fiber optic microphone. The microphones may include a microelectrical-mechanical system (MEMS) microphone.

The audio transmitting table may include acoustic insulation positioned between the table top and the frame. The audio transmitting table may further include a speaker embedded in the non-perpendicular contour edges. The speaker may transmit audio data from the controller.

BRIEF DESCRIPTION OF THE DRAWINGS

A more particular description of the invention briefly described above is made below by reference to specific embodiments. Several embodiments are depicted in drawings included with this application, in which.

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

Figure 1:
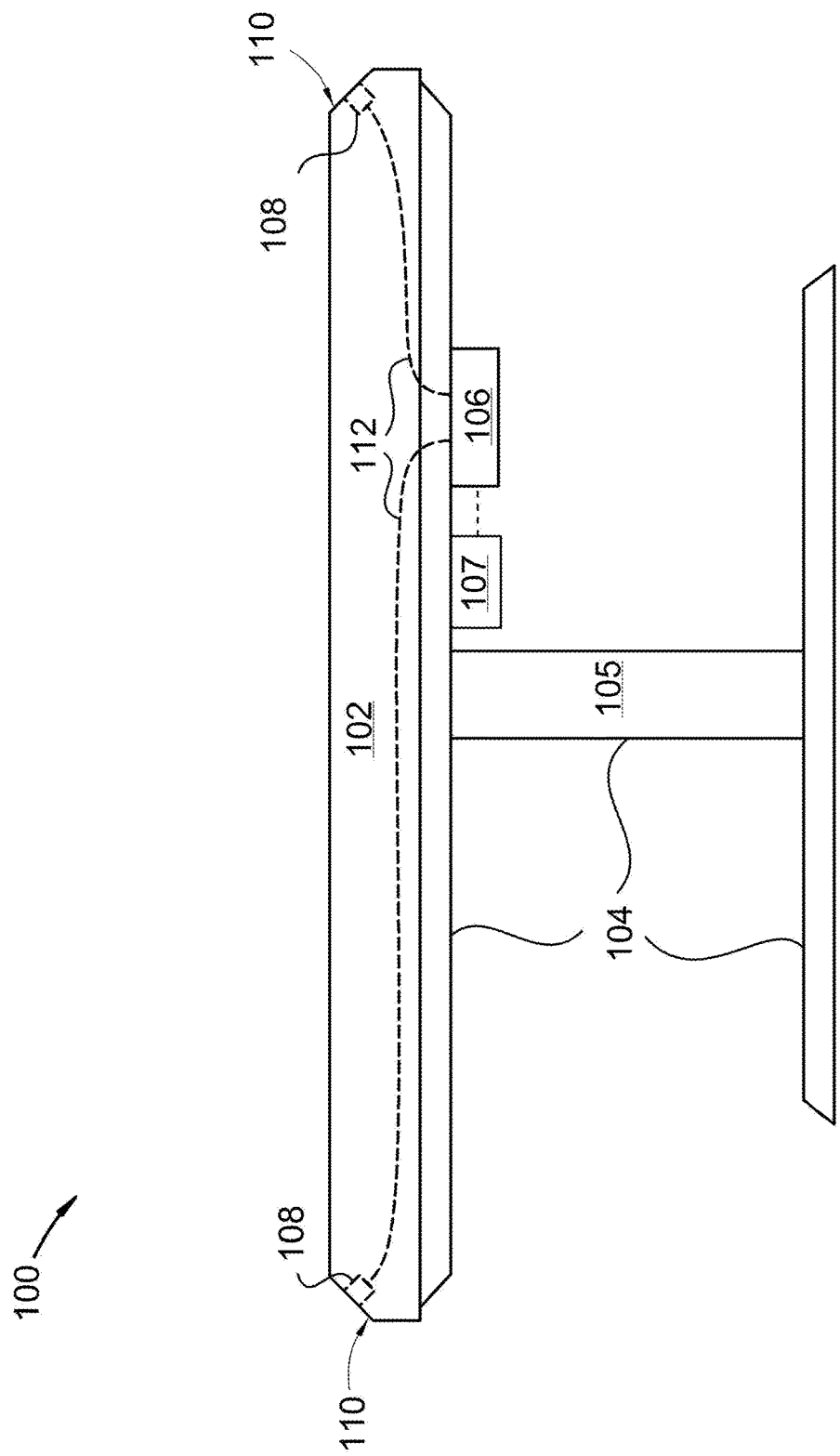
FIG. 1 depicts a front view of an audio transmitting table.

FIG. 1 depicts a front view of an audio transmitting table. Audio transmitting table 100 includes table top 102, frame 104, controller 106, and multiple microphones 108. Table top 102 has one or more non-perpendicular contour edges 110. Frame 104 is attached to table top 102. Controller 106 is attached to audio transmitting table 100. Multiple microphones 108 are embedded in non-perpendicular contour edges 110. Each microphone 108 transmits audio data to controller 106.

Microphones 108 may collect audio data and send the audio data to controller 106. Controller 106 may interpret the audio data and/or store the audio data. The microphones may comprises a microphone speaker combination.

Table top 102 may include any of a variety of materials, such as granite, marble, wood, bamboo, fiberboard, composites, metals, ceramics, glass, or polymers. Materials included in table top 102 may affect acoustic transmission via table top 102 to microphones 108. For example, if a user created a sound by placing an object on table top 102, the materials included in table top 102 may affect propagation of sound vibrations to microphones 108.

Frame 104 may be attached to table top 102 using any of a variety of means, such as mechanical fastening, adhesive fastening, welding, or magnetic fastening. Controller 106 may be attached to frame 104. Frame 104 may include column 105.

Microphones 108 may be connected electrically to controller 106 via wiring 112. Microphones 108 may be placed at regular or irregular intervals along contour edges 110. Microphones 108 may be placed at specific locations along contour edges 110. For example, microphones 108 may be placed at optimal locations along contour edges 110, where optimal locations are locations which maximize available audio data from users and/or minimize noise, such as propagating vibrations.

Contour edges 110 may include a chamfer, where a chamfer is a symmetrical sloping surface at an edge or corner. An angle between a top surface of table top 102 and a sloping surface of a chamfer of contour edges 110 may be between 0 and 90 degrees, exclusive, or between 90 and 180 degrees, exclusive.

Microphones 108 may include a capacitor microphone. A capacitor microphone may have multiple capacitive plates. A diaphragm may act as one of the plates so that vibrations produce changes in a distance between the plates. As the distance between the plates changes, so does a capacitance between the plates. Audio data may be collected by microphones 108 due to change in capacitance. Microphones 108 may include an electret capacitor microphone.

Microphones 108 may include a dynamic microphone. Dynamic microphones work via electromagnetic induction. Microphones 108 may include both a capacitor microphone and a dynamic microphone. The microphones may comprises a microphone speaker combination.

Different audio data may be collected by each of microphones 108. The different audio data may be sent to controller 106, and controller 106 may combine the different audio data. Controller 106 and microphones 108 may be powered via power source 107. Power source 107 may be any of a variety of power sources, such as a battery, a capacitor, a power outlet, or solar cells.

Microphones 108 may include a piezoelectric microphone. Microphones 108 may include a fiber optic microphone. A fiber optic microphone may convert acoustic waves into electrical signals by sensing changes in light intensity. During operation, light from a laser source may travel through an optical fiber to illuminate a surface of a reflective diaphragm. Sound vibrations of the diaphragm may modulate an intensity of light reflecting off the diaphragm in a specific direction. The modulated light may then be transmitted over a second optical fiber to a photo detector, which may transform intensity-modulated light into audio data.

Microphones 108 may include a microelectrical-mechanical system (MEMS) microphone. MEMS microphones 108 may have physical dimensions less than 3 mm by 3 mm by 1 mm.

Figure 2:
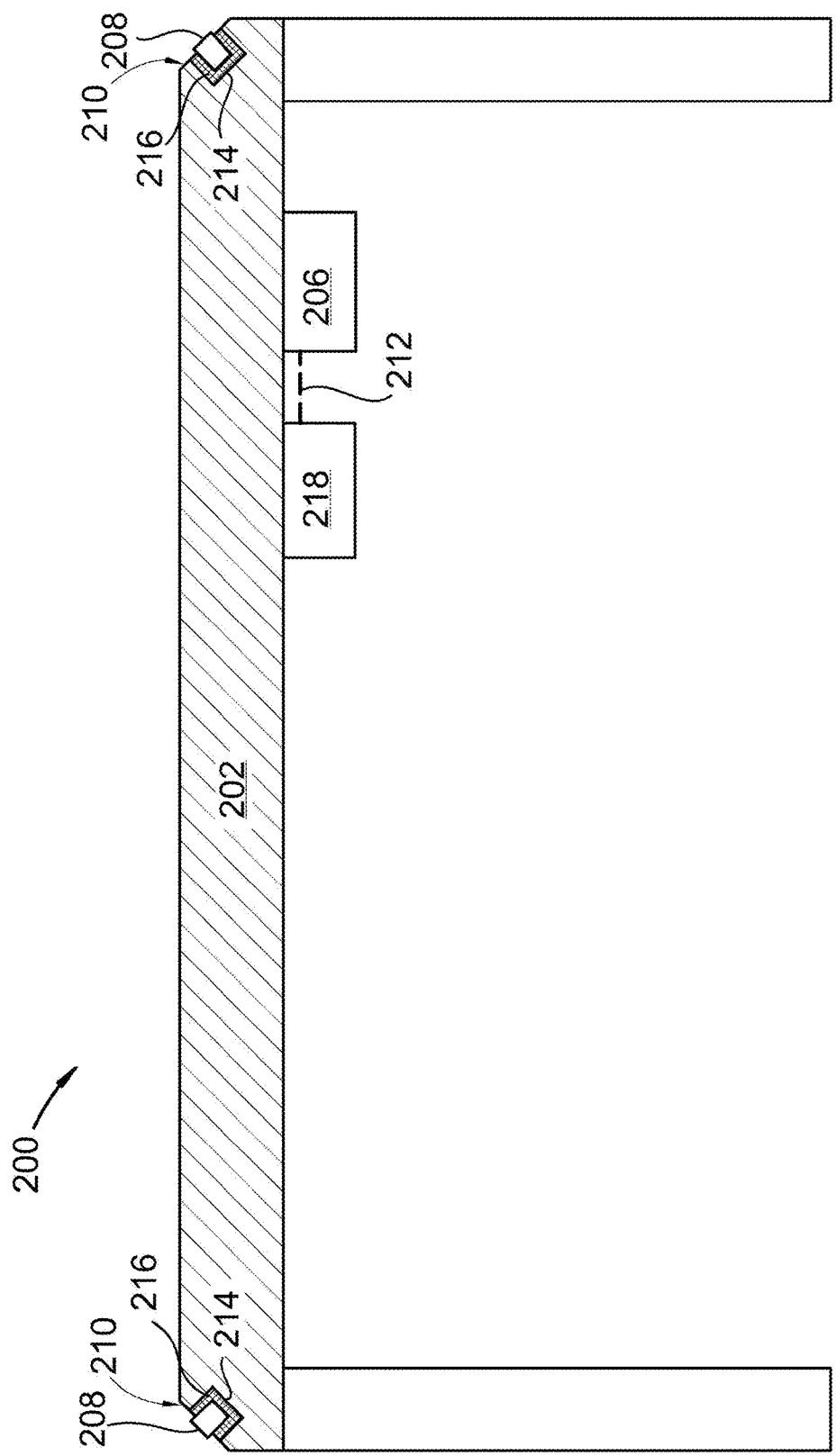
FIG. 2 depicts an embodiment similar to FIG. 1 with apertures.

FIG. 2 depicts an embodiment similar to FIG. 1 with apertures. Contour edges 210 of audio transmitting table 200 may include apertures 214. Apertures 214 may house microphones 208. Apertures 214 may include acoustic insulation 216. Acoustic insulation 216 may be positioned between each of apertures 214 and corresponding microphones 208. Acoustic insulation 216 may dampen vibrations which propagate through table top 202. Acoustic insulation 216 may include any of a variety of materials, such as acoustic foam, acoustic gel, or acoustic fabric.

Audio transmitting table 200 may include wireless transmitter 218. Wireless transmitter 218 may be electrically connected to controller 206 via wiring 212. A user may send data to wireless transmitter 218 via a peripheral device, such as a remote control, smart phone, or laptop. Wireless transmitter 218 may subsequently send the data to controller 206 via wiring 212. Controller 206 may subsequently send commands to microphones 208 to collect audio data.

Microphones 208 may be wireless microphones. For example, microphones 208 may collect audio data and send the audio data to wireless transmitter 218. Subsequently, wireless transmitter 218 may send the audio data to controller 206 via wiring 212. Controller 206 may subsequently store the audio data and/or send the audio data to a peripheral device, such as a smart phone, laptop, or wireless router, via wireless transmitter 218.

Figure 3:
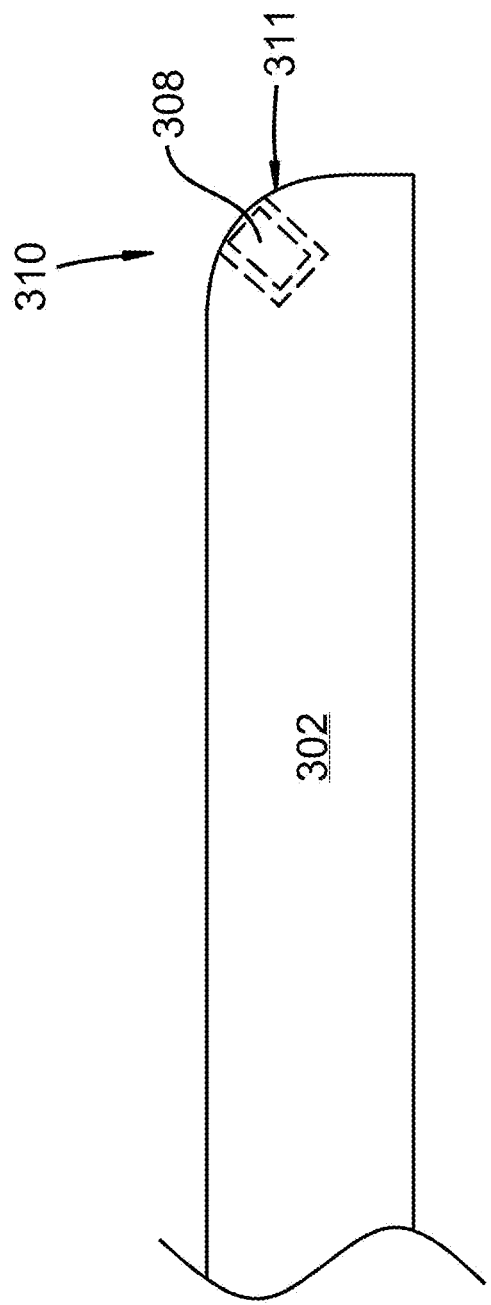
FIG. 3 depicts a table top edge profile.

FIG. 3 depicts a table top edge profile. Contour edge 310 of table top 302 may include fillet 311, where a fillet is a surface corresponding to a rounded interior or exterior edge or corner. Fillet 311 may protect microphones 308 from impact of objects. For example, a user may push an object toward contour edge 310. The object may strike fillet 311 instead of microphone 308.

Figure 4:
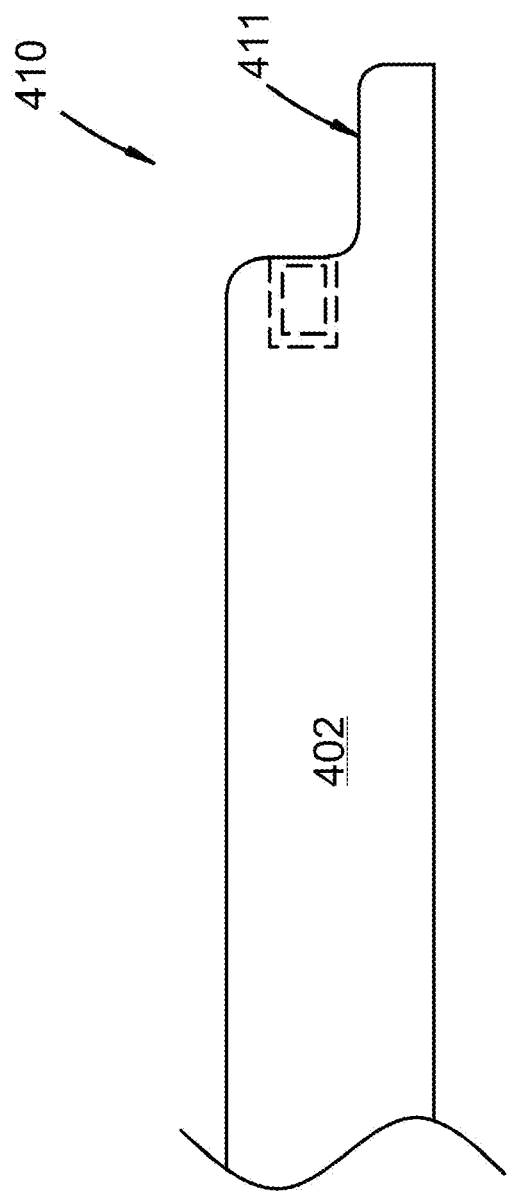
FIG. 4 depicts an embodiment similar to FIG. 3 with an ogee profile.

FIG. 4 depicts an embodiment similar to FIG. 3 with an ogee profile. Contour edge 410 of table top 402 may include ogee surface 411, where an ogee surface is a surface bounded by an extruded continuous S-shaped curve.

Figure 5:
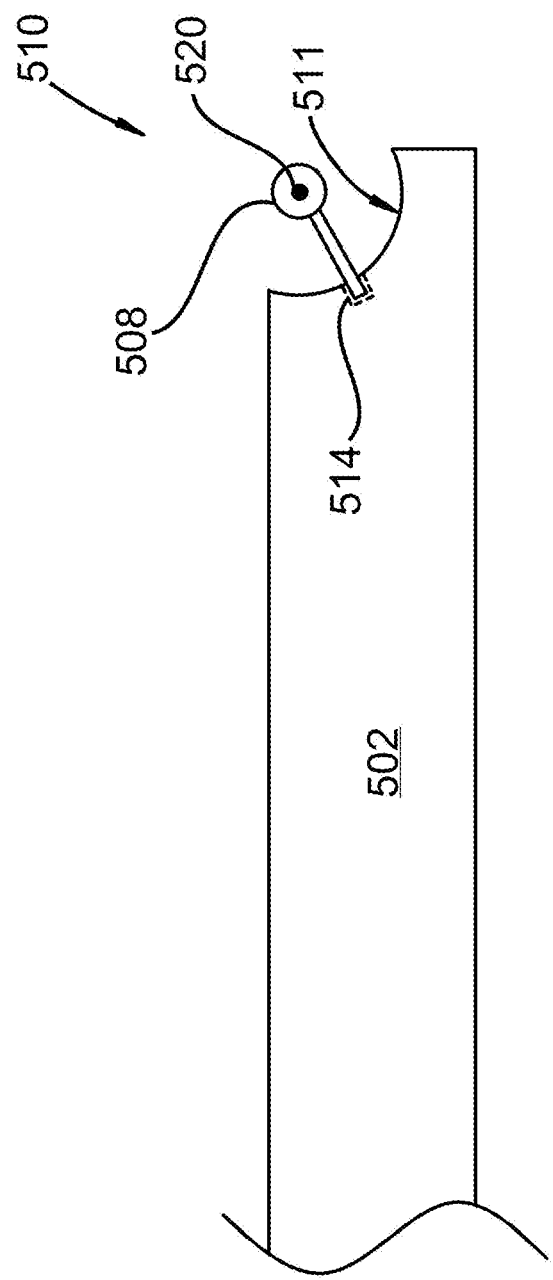
FIG. 5 depicts an embodiment similar to FIG. 3 with a concave profile.

FIG. 5 depicts an embodiment similar to FIG. 3 with a concave profile. Contour edge 510 of table top 502 may include concave surface 511. Concave surface 511 may include focal axis 520. Sound waves may refract off of concave surface 511 and converge along focal axis 520. Microphones 508 may be positioned extending from apertures 514 such that microphones 508 intersect focal axis 520. This may increase audio reception of microphones 508.

Figure 6:
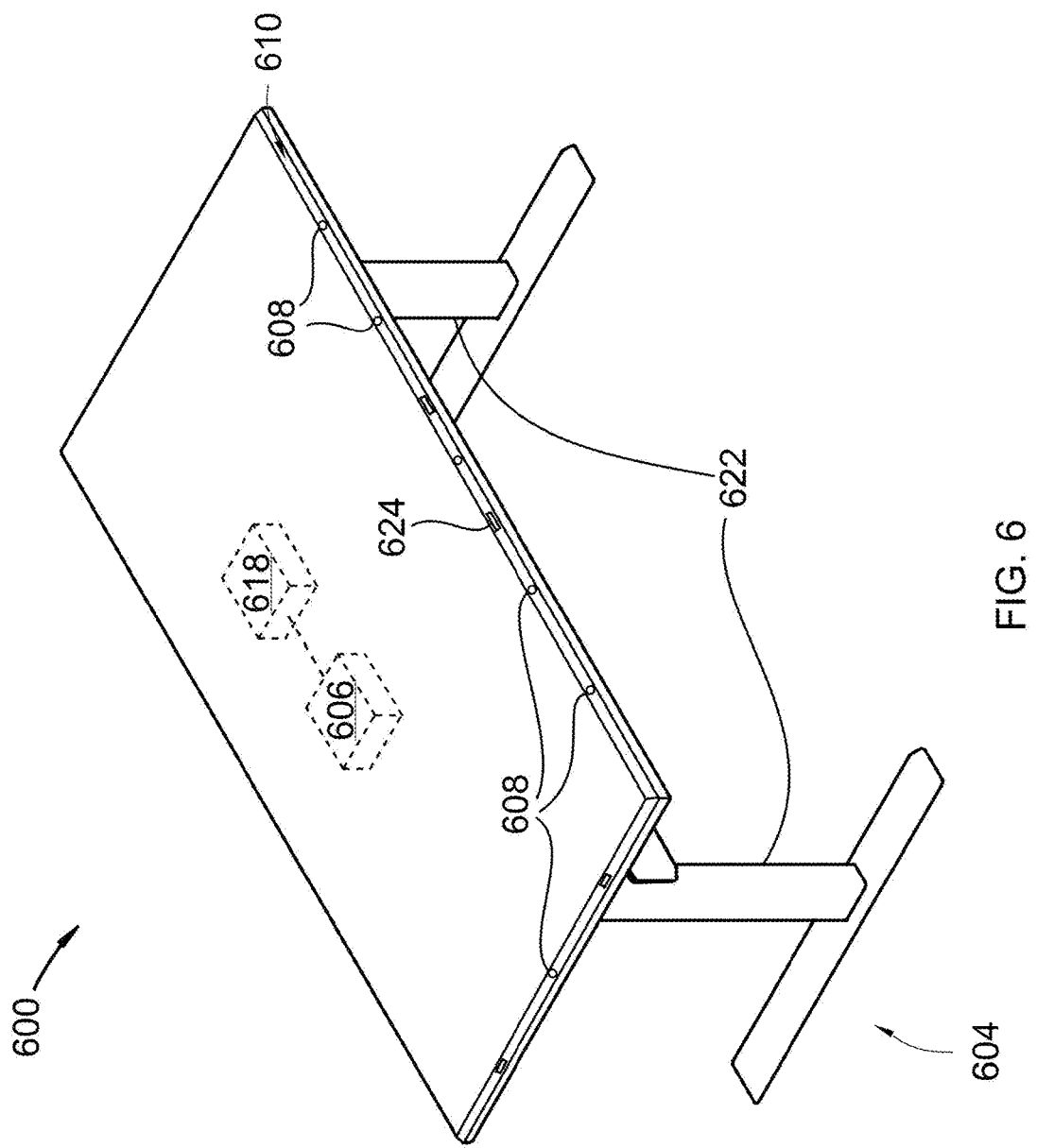
FIG. 6 depicts a perspective view of an audio transmitting table.

Microphones 508 may have an omnidirectional polar pattern, wherein a polar pattern indicates how sensitive a microphone is to sounds arriving at different angles about a central axis of the microphone. The microphones may comprises a microphone speaker combination. FIG. 6 depicts a perspective view of an audio transmitting table. Frame 604 of audio transmitting table 600 may include multiple legs 622. Audio transmitting table 600 may further include speaker 624 embedded in contour edges 610. Speaker 624 may transmit audio data from controller 606.

For example, a first user may speak near audio transmitting table 600. Microphones 608 may collect a first set of audio data and send it to controller 606. Controller 606 may send the first set of audio data to a peripheral device via wireless transmitter 618. A second user may receive the first set of audio data from the peripheral device and send a second set of audio data to wireless transmitter 618 via the peripheral device. Wireless transmitter 618 may send the second set of audio data to controller 606. Controller 606 may send the second set of audio data to speaker 624. Speaker 624 may transmit the second set of audio data such that the first user may hear it.

Figure 7:
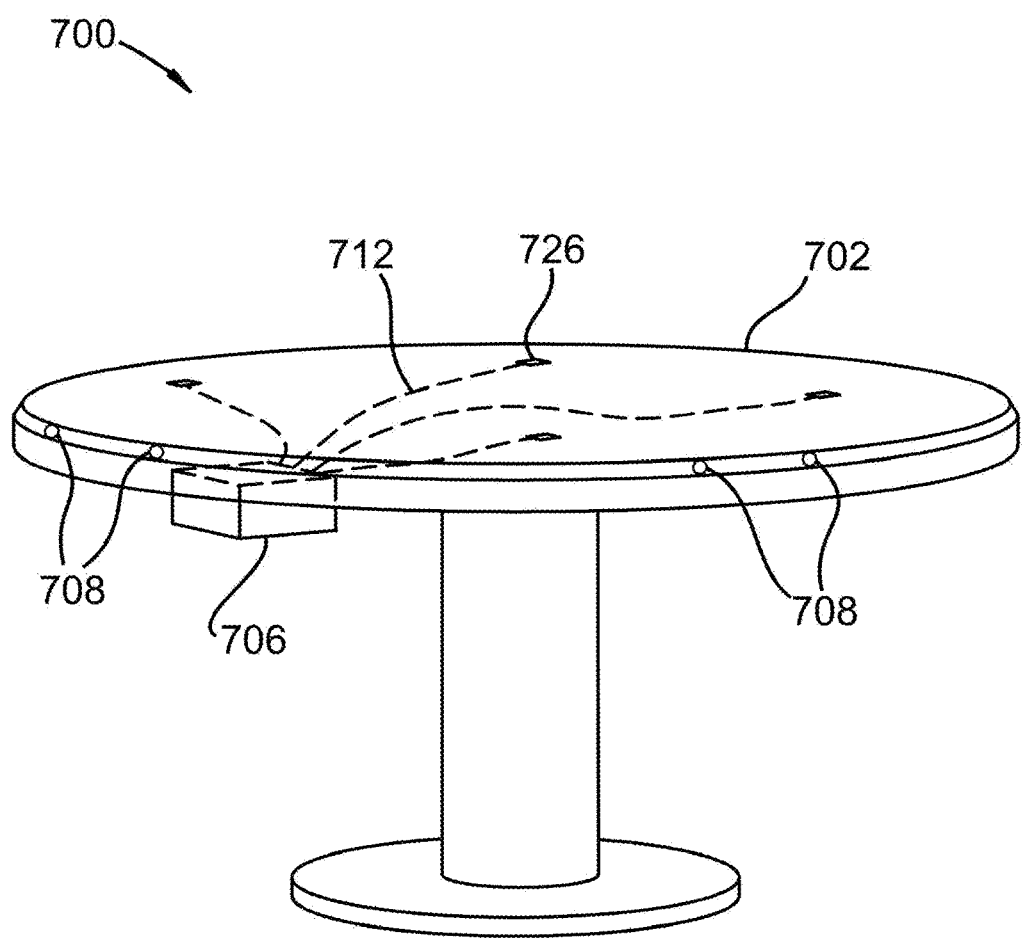
FIG. 7 depicts a perspective view of a round audio transmitting table.

FIG. 7 depicts a perspective view of a round audio transmitting table. Audio transmitting table 700 may include temperature sensor 726. Temperature sensor 726 may be electrically connected to controller 706. Temperature sensor 726 may be positioned on table top 702. Temperature sensor 726 may actively or passively collect temperature data. Temperature sensor 726 may send the temperature data to controller 706 wirelessly or via wiring 712. Controller 706 may interpret the temperature data and send commands to microphones 708 to activate or deactivate.

Figure 8:
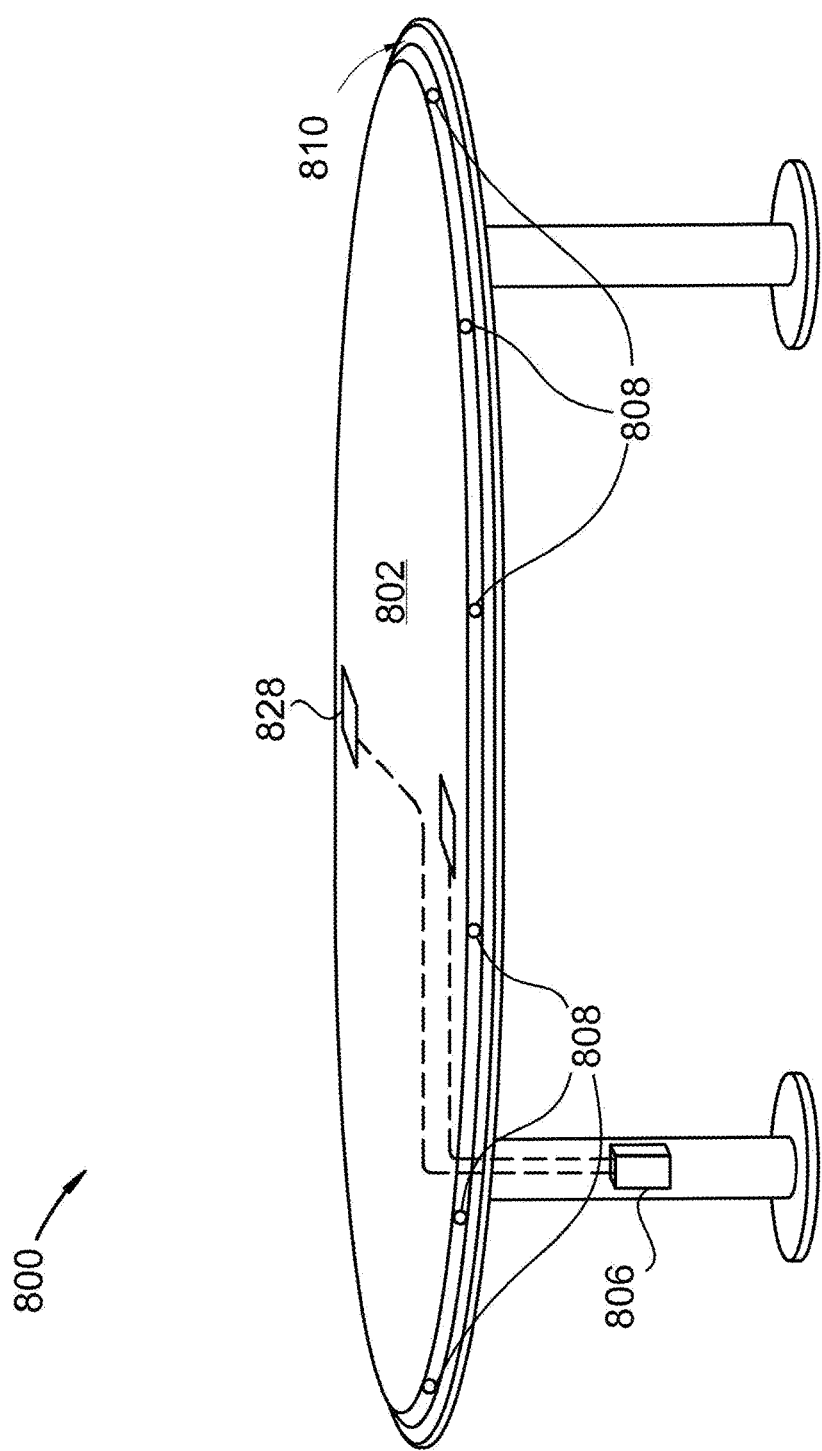
FIG. 8 depicts a perspective view of an oval audio transmitting table.

FIG. 8 depicts a perspective view of an oval audio transmitting table. Audio transmitting table 800 may include light sensor 828. Light sensor 828 may be electrically connected to controller 806. Light sensor 826 may be positioned on table top 802. Light sensor 826 may be positioned on contour edges 810. Light sensor 826 may actively or passively collect light data. Light sensor 826 may send the light data to controller 806. Controller 806 may interpret the light data and send commands to microphones 808 to activate or deactivate.

Figure 9:
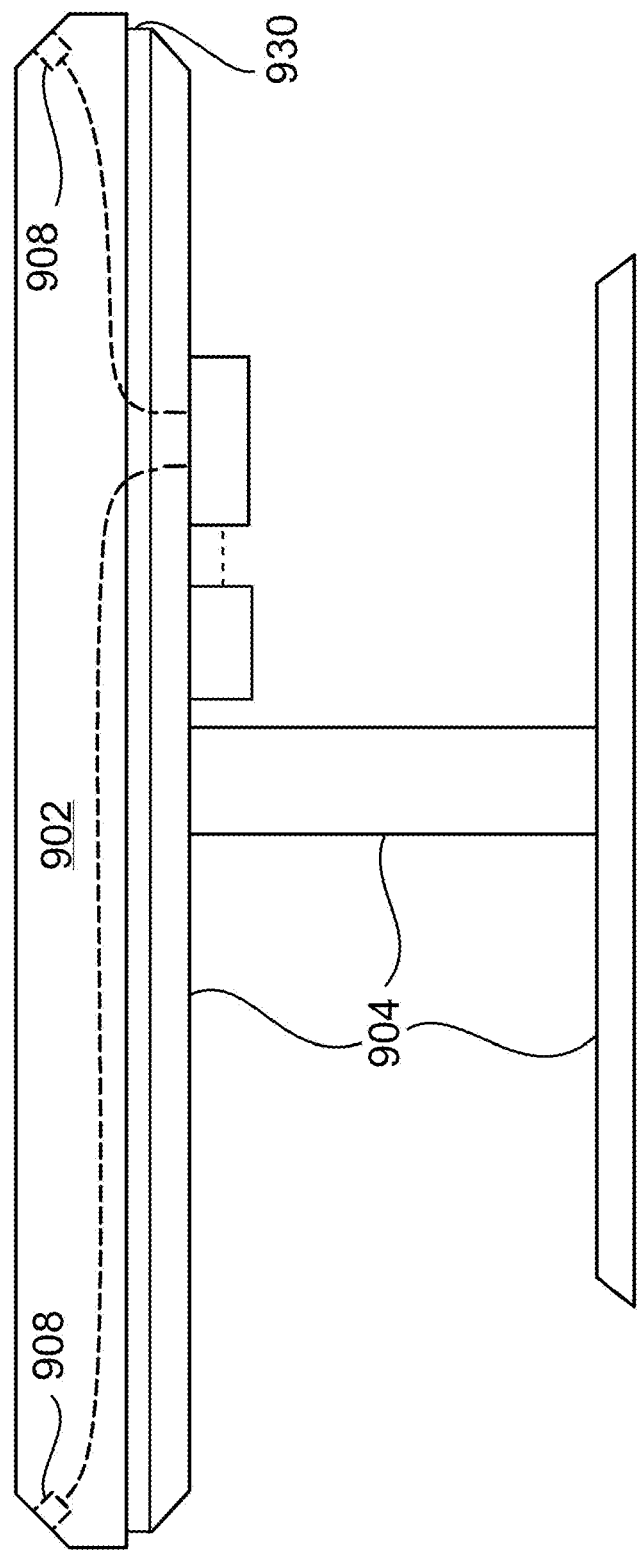
FIG. 9 depicts an embodiment similar to FIG. 6 with acoustic insulation.

FIG. 9 depicts an embodiment similar to FIG. 6 with acoustic insulation. Audio transmitting table 900 may include acoustic insulation 930 positioned between table top 902 and frame 904. Acoustic insulation 930 may include any of a variety of materials, such as acoustic foam, acoustic gel, or acoustic fabric. Acoustic insulation 930 may dampen vibrations between table top 902 and frame 904, such that vibrations propagating through frame 904 may be dampened stopped before reaching microphones 908.

Acoustic insulation 930 may also impede impact and resulting vibrational propagation between table top 902 and frame 904. For example, table top 902 may be struck with an object such that table top 902 is accelerated toward frame 904. Acoustic insulation 930 may absorb some of kinetic energy of accelerated table top 902; subsequently, energy available to cause vibrations due to table top 902 and frame 904 colliding may be less.

Figure 10:
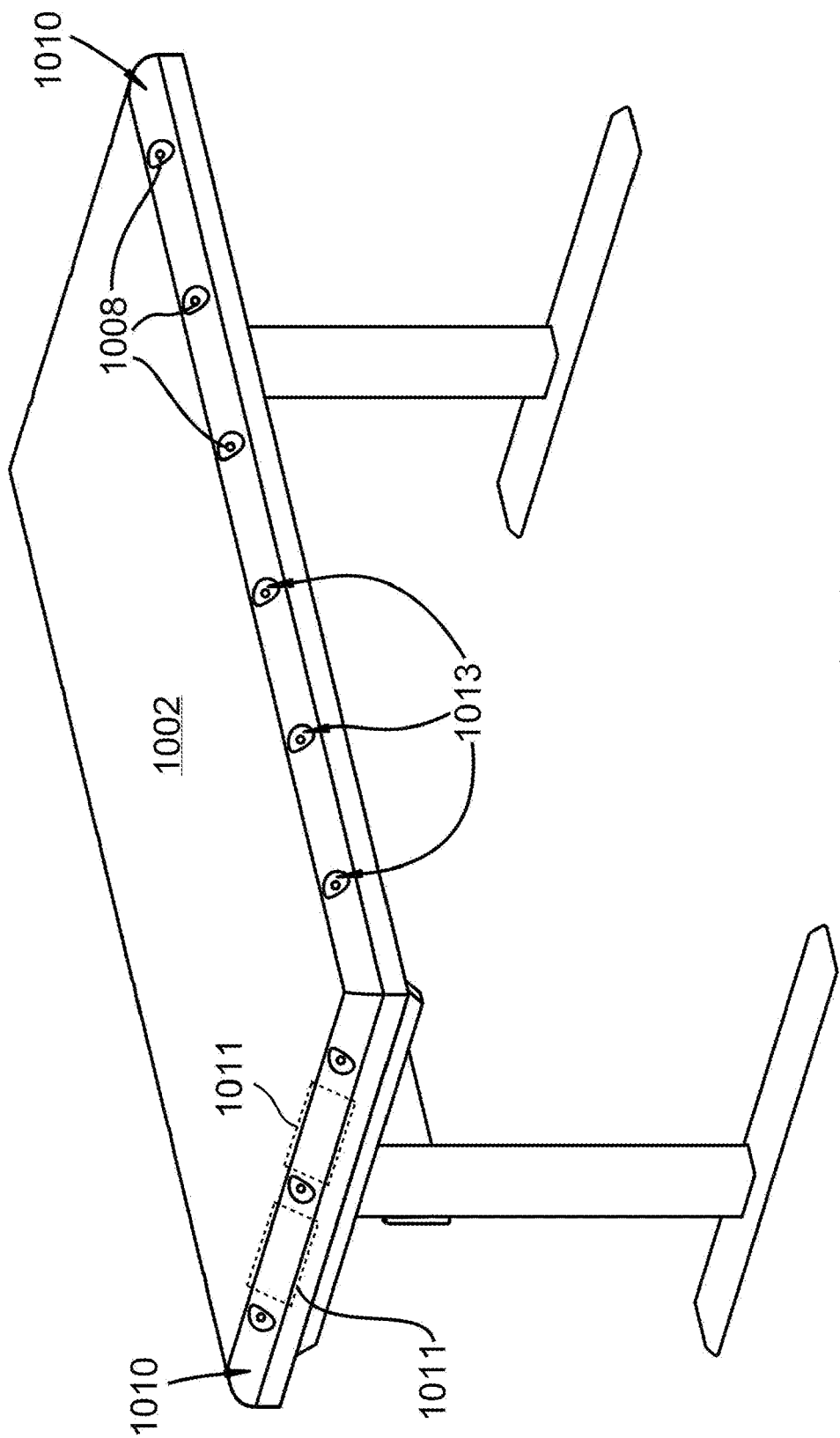
FIG. 10 depicts a perspective view a table top.

FIG. 10 depicts a perspective view a table top. Contour edges 1010 of table top 1002 may include both fillets 1011 and concave surfaces 1013. Each of concave surfaces 1013 may include a corresponding focal point. Each focal point may be a point where sound incident on each corresponding concave surface 1013 converges. Fillets 1011 may protect microphones 1008 from damage, while concave surfaces 1013 may improve audio reception to microphones 1008. Microphones 1008 may have an omnidirectional polar pattern. Microphones 1008 may be concentric with each corresponding focal point.

The invention claimed is:

1. An audio transmitting table comprising:
   a table top having a top surface and a bottom surface and a non-perpendicular circumferential edge comprising a circumferential concave surface comprising focal axes joining the top surface and the bottom surface;
   a circumferential diameter of the top surface being less than a circumferential diameter of the bottom surface;
   a frame attached to the table top;
   a controller attached to the audio transmitting table; and
   multiple microphones linearly disposed within the concave surface along the focal axes, wherein
   each microphone transmits audio data to the controller.

2. The audio transmitting table of claim 1, wherein the circumferential edge comprises apertures in which the microphones are embedded and which house the microphones.

3. The audio transmitting table of claim 2, wherein the apertures comprise acoustic insulation positioned between each aperture side wall and corresponding microphone.

4. The audio transmitting table of claim 1, wherein the circumferential edge comprises a chamfer joining the top surface and the bottom surface.

5. The audio transmitting table of claim 1, wherein the circumferential edge comprises a fillet joining the top surface and the bottom surface.

6. The audio transmitting table of claim 1, wherein the circumferential edge comprises an ogee surface joining the top surface and the bottom surface.

7. The audio transmitting table of claim 1, wherein the circumferential edge comprises a concave surface joining the top surface and the bottom surface.

8. The audio transmitting table of claim 1, wherein the frame comprises multiple legs.

9. The audio transmitting table of claim 1, wherein the frame comprises a column.

10. The audio transmitting table of claim 1, comprising a temperature sensor electrically connected to the controller.

11. The audio transmitting table of claim 1, comprising a light sensor electrically connected to the controller.

12. The audio transmitting table of claim 1, comprising a wireless transmitter electrically connected to the controller.

13. The audio transmitting table of claim 1, wherein the microphones comprise a capacitor microphone.

14. The audio transmitting table of claim 1, wherein the microphones comprise a dynamic microphone.

15. The audio transmitting table of claim 1, wherein the microphones comprise a piezoelectric microphone.

16. The audio transmitting table of claim 1, wherein the microphones comprise a fiber optic microphone.

17. The audio transmitting table of claim 1, wherein the microphones comprise a microelectrical-mechanical system (MEMS) microphone.

18. The audio transmitting table of claim 1, comprising acoustic insulation positioned between the table top and the frame.

19. The audio transmitting table of claim 1, further comprising a speaker embedded in the non-perpendicular circumferential edge, wherein the speaker transmits audio data from the controller.

20. The audio transmitting table of claim 1, wherein the microphones comprise a microphone speaker combination.

* * * * *